United States Patent
Scocco et al.

(10) Patent No.: US 8,601,741 B2
(45) Date of Patent: Dec. 10, 2013

(54) AUTOMATIC CLOSING DEVICE FOR VEHICLE DOOR

(75) Inventors: Marco Scocco, Recanati (IT); Francesco Capogrosso, Ancona (IT)

(73) Assignee: SO.GE.MI.-S.P.A., Dronero, Cuneo (IT)

( * ) Notice: Subject to any disclaimer, the term of this patent is extended or adjusted under 35 U.S.C. 154(b) by 51 days.

(21) Appl. No.: 13/138,632

(22) PCT Filed: Mar. 22, 2010

(86) PCT No.: PCT/EP2010/053721
§ 371 (c)(1),
(2), (4) Date: Sep. 13, 2011

(87) PCT Pub. No.: WO2010/108896
PCT Pub. Date: Sep. 30, 2010

(65) Prior Publication Data
US 2012/0000132 A1   Jan. 5, 2012

(30) Foreign Application Priority Data
Mar. 24, 2009   (IT) .............................. MC2009A0062

(51) Int. Cl.
*E05F 15/00* (2006.01)
*F16D 23/10* (2006.01)

(52) U.S. Cl.
USPC .................... 49/139; 192/105 CF; 192/103 B (58) Field of Classification Search
USPC ....... 49/139, 140, 141; 74/89.14, 421 A, 405, 74/425; 292/144, 201, 341.15–341.17, 292/DIG. 25, DIG. 62, DIG. 65; 192/105 CF, 192/104 C, 103 B; 70/277, 222, 422, 472, 70/278.7

See application file for complete search history.

(56) References Cited

U.S. PATENT DOCUMENTS

| 3,080,020 | A | * | 3/1963 | Hershey ........................ 188/184 |
| 3,223,208 | A | * | 12/1965 | Ryan et al. .................... 188/184 |
| 3,625,326 | A | * | 12/1971 | Rix et al. ................ 192/105 CE |
| 3,833,101 | A | * | 9/1974 | Pozella et al. .......... 192/105 CF |
| 4,195,721 | A | * | 4/1980 | Shea ..................... 192/105 CD |
| 4,336,870 | A | * | 6/1982 | Shea ....................... 192/105 CF |
| 4,949,826 | A | * | 8/1990 | Ohkanda ..................... 192/81 C |
| 5,039,925 | A | * | 8/1991 | Schap ........................... 318/282 |
| 5,280,828 | A | * | 1/1994 | Reynoso et al. ............. 188/184 |
| 5,503,261 | A | * | 4/1996 | Schultz .................. 192/105 CD |
| 5,560,460 | A | * | 10/1996 | Ezawa ........................... 192/46 |
| 2008/0121489 | A1 | * | 5/2008 | Chevalier ................ 192/105 BB |
| 2011/0005889 | A1 | * | 1/2011 | Webb et al. ............... 192/104 C |

* cited by examiner

*Primary Examiner* — Katherine Mitchell
*Assistant Examiner* — Scott Denion
(74) *Attorney, Agent, or Firm* — Lowe Hauptman & Ham, LLP (57) ABSTRACT

A closing device for a vehicle door is disclosed, comprising an electrical motor provided with a shaft (A), a worm (V) driven into rotation by said shaft (A), a gear in which said worm (V) is meshed, and transmission means that connect said gear with a lock striker of the closing device. An uncoupling device (1) is positioned between said shaft (A) and said worm (V). The uncoupling device couples the shaft (A) to the worm (V) when the shaft rotates and uncouples the shaft (A) from the worm (V) when the shaft (A) is motionless.

6 Claims, 10 Drawing Sheets

AUTOMATIC CLOSING DEVICE FOR VEHICLE DOOR

The present patent application for industrial invention relates to an automatic closing device of a vehicle door lock, in particular for rear boot doors.

As it is known, a vehicle door generally comprises a lock that is snap fitted with a pin or striker provided in the vehicle frame.

For safety reasons, the lock must be provided with double click. The first click corresponds to temporary closing obtained by positioning the door on the frame. The second click corresponds to final closing obtained by exerting pressure on the door in such a way to adequately compress the perimeter gaskets provided on the car door and/or frame.

In recent years sophisticated cars have been provided with a device for automatic closing of the rear boot door.

If the door is simply positioned against the frame, and the pin of the lock only makes the first click, the automatic device is designed to provide perfect door closing by hooking said pin and dragging it until it makes the second click.

Figure 1:
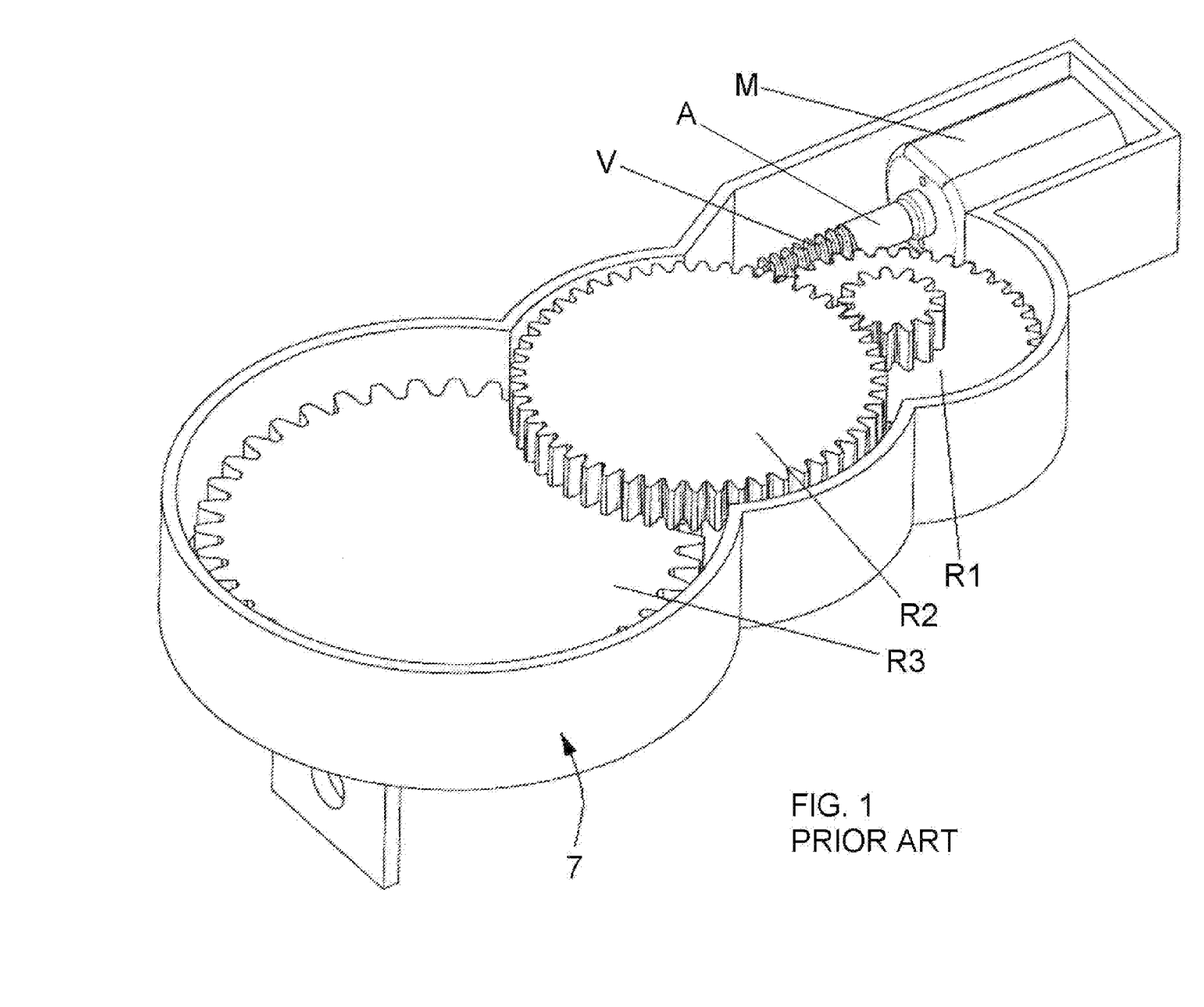
FIG. 1 is a top perspective view of an automatic closing device of a vehicle door according to the prior art.
Figure 2:
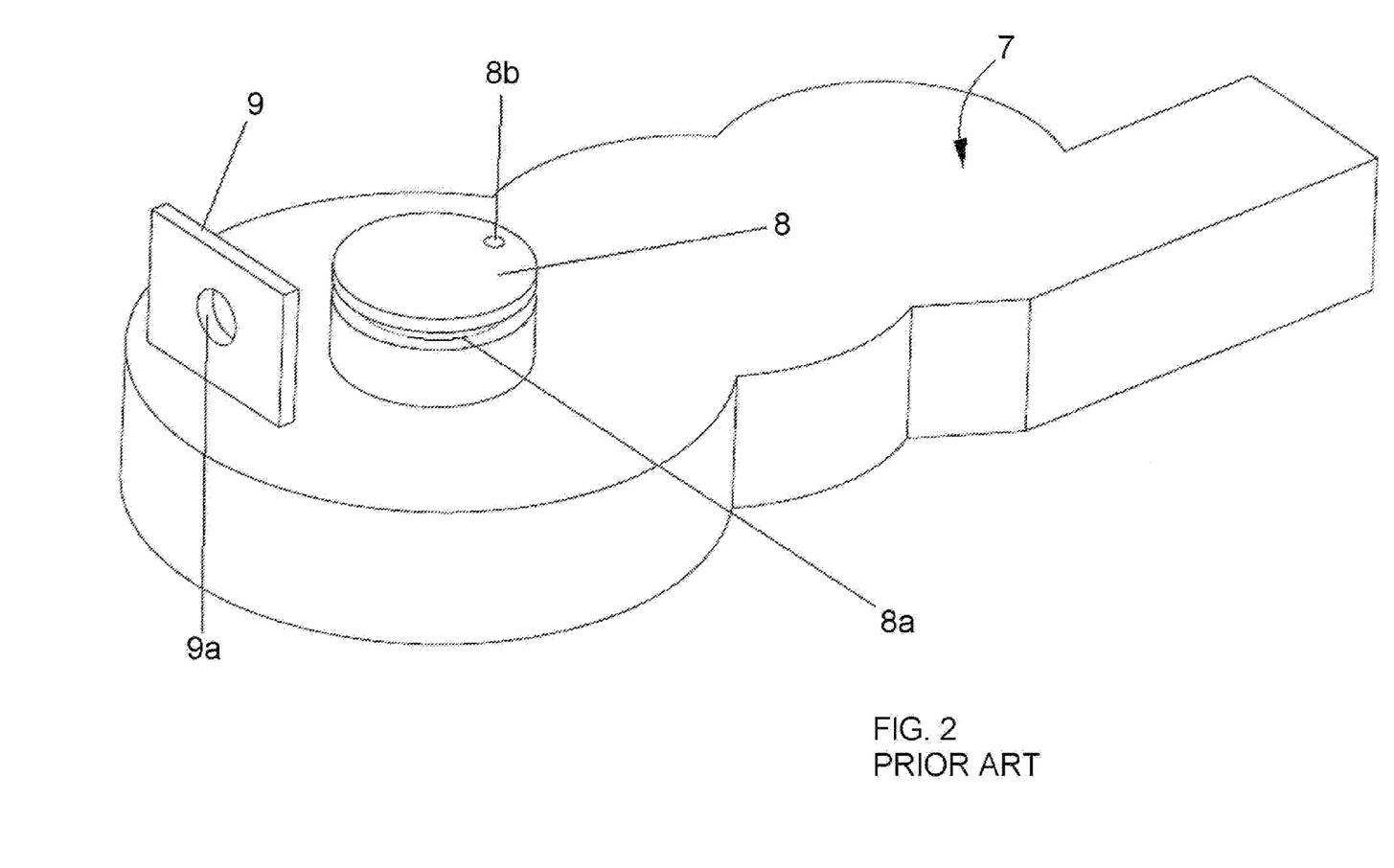
FIG. 2 is a bottom perspective view of the closing device of FIG. 1.

In order to understand the structural configuration of a traditional automatic device of known type, this description continues with reference to two drawings, FIGS. 1 and 2, which respectively show the front and the back of said device.

Referring to FIG. 1, said device is composed of an elongated box-shaped frame (7) that contains an electrical motor (M) with shaft (A) having an axis of rotation parallel to the bottom wall of the frame. The shaft (A) is connected to a worm (V) that engages with a first tooth wheel (R1) rotating on a pin, the axis of which is perpendicular to the bottom wall of the frame. Said first tooth wheel (R1) is the first of a series of reduction gears (R1, R2, R3) that mutually engage in pairs.

As shown in FIG. 2, the last gear (R3) has a rotational pin that protrudes outside the bottom wall of the frame to support a pulley (8) provided with a groove (8a) on the lateral surface. In the groove (8a) of the pulley a steel cable (not shown in FIG. 2) is partially wound, being provided with an enlarged head at the end. The pulley (8) is provided with a housing (8b) for the enlarged ending head of said steel cable. The cable is contained inside an ordinary sheath with possibility of sliding with respect to said sheath.

As shown in FIG. 2, a bracket (9) is situated on the bottom wall of the box-shaped frame (7), orthogonally protruding towards the outside. The bracket (9) has a hole (9a) with suitable diameter to prevent the insertion of the cable sheath. Therefore, the steel cable remains uncovered for the section between the housing (8b) that locks the head of the cable and the hole (9a) that locks the sheath.

The other end of the cable is fixed to an oscillating lever that engages the lock striker during its operational travel and drags it until it makes the second click.

The electrical motor (M) of the device is automatically actuated by a proximity sensor as soon as the lock striker makes the first click, so that the door is perfectly locked also if manual closing is not carried out with sufficient energy to cause the second click of the lock striker.

As soon as the lock striker makes the second click, the electrical motor (M) changes the rotation direction, releasing the cable and allowing the oscillating lever to return to idle position by means of a return spring.

Clearly, other transmission means can be provided to actuate the striker instead of the gear train shown in FIGS. 1 and 2 that actuates the cable that pulls the lock striker.

The main inconvenience of said device consists in the fact that, in case of accidental blocking of the device during operation, due to breakage or power failure, the oscillating lever will stop, preventing the backward rotation of the striker, which will remain blocked in intermediate position between the first and second click, thus blocking the lock and the door, without possibility of opening it.

In this case, an emergency key must be used to actuate the gears (R1, R2, R3), being impossible to provide the device with a return spring.

In fact, if the last gear (R3) was provided with a return spring, the thrust exerted by the spring on the gear would be incapable of making the entire gear train (R2, R1) rotate backwards, since the system is of irreversible type. On the other hand, if the return spring was provided on the first gear (R1), it would be necessary to increase the performance of the electrical motor (M) considerably, with increase of costs and volumes for the device as a whole.

So far the latter solution has not been adopted also because no suitable springs are currently available, considering that the first gear (R1) must make several revolutions for the striker to complete the travel necessary to cause the second click of the lock.

U.S. Pat. No. 7,341,292 discloses a striker driving assembly for a motor vehicle door lock, provided with two cams.

GB 2 424 045 discloses a centrifugal clutch that is rotatably balanced, when engaged.

The purpose of the present invention is to remedy the aforesaid drawbacks by disclosing an automatic closing device for a motor vehicle door lock that is provided with reversible reduction assembly, is more reliable and safer and causes no problems in case of failure.

The closing device for vehicle door according to the invention comprises:

an electrical motor with shaft,
a worm driven into rotation by said shaft,
a gear in which said worm is meshed,
transmission means that connect said gear to the lock striker of said closing device.

An uncoupling device is positioned between said shaft and said worm. The uncoupling device couples the shaft to the worm when the shaft rotates and uncouples the shaft from the worm when the shaft is motionless.

The uncoupling device comprises:

a support joined to the shaft,
a flange connected to said support,
a pair of claws mounted on said flange and provided with teeth designed to engage with the toothing of a tooth wheel joined to said worm, and
a spring positioned between said support and said flange in such a way to bring the flange to a position in which the teeth of the claws do not engage with the toothing of the tooth wheel joined to the worm.

The advantages of the closing device according to the invention are evident. In fact, in case of breakage or jamming of said closing device, the lever that actuates the lock striker can be easily actuated by the operator in view of the fact that the worm is uncoupled from the drive shaft.

For purposes of clarity, the description of the automatic closing device of a vehicle door lock according to the present invention continues with reference to the enclosed drawings, which only have an illustrative, not limiting purposes, wherein.

Figure 3:
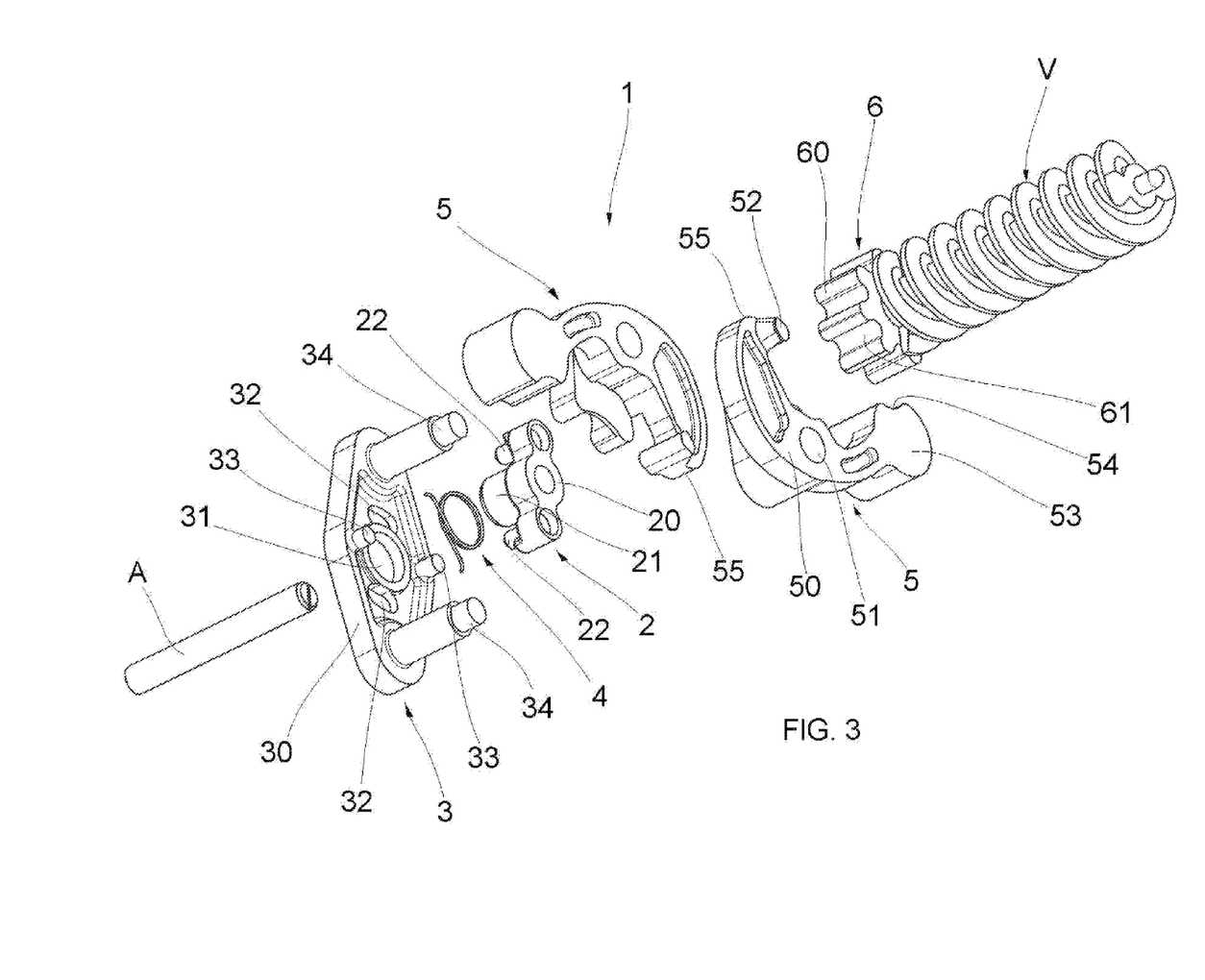
FIG. 3 is an exploded perspective view of an uncoupling device according to the invention, situated between a drive shaft and a worm of the automatic closing device.

Referring to FIG. 3 a drive shaft (A) is disclosed, which is driven into rotation by an electrical motor and a worm (V) adapted to drive into rotation a gear that controls the actuation of the door lock striker 110 by means of transmission means 120.

In accordance with the present invention an uncoupling device (1) is positioned between the drive shaft (A) and the worm (V), which couples the shaft (A) to the worm (V) when the shaft (A) rotates and uncouples the shaft (A) from the worm (V) when the shaft (A) is motionless.

The uncoupling device (1) comprises a support (2) joined to the shaft (A). The support (2) engages with a pulley (3) provided with two claws (5) that engage with a tooth wheel (6) mounted at one end of the worm (V). A spring (4) is positioned between support (2) and flange (3).

The support (2) comprises a body (20) from which a central tang (21) protrudes, being provided with a hole to fix the end of the shaft (A). Two pins (22) protrude from the body (20) in diametrally opposite positions with respect to the central tang (21).

The flange (3) has a body with elongated rhombus shape and is provided with a central hole (31) where the central tang (21) of the support is rotatably engaged. Two slots (32) are obtained in the body of the flange in diametrally opposite positions with respect to the central hole (31). In this way the pins (22) of the support can be disposed inside the slots (32) of the flange and slide inside them.

Two projections (33) are arranged in the body (30) of the flange in diametrally opposite positions with respect to the central hole (31) and angularly spaced by 90° from the slots (32). The projections (33) of the flange act as back elements for the ends of the spring (4) that is shaped as a coil that winds up around the central tang (21) of the support.

Two pins (34) are mounted at the peripheral ends of the body (30) of the flange.

The claws (5) are identical. Each claw (5) comprises a C-shaped body (50) that extends for an arc of circle of approximately 180°. A hole (51) is obtained in the central part of the body (50), where the pin (34) of the flange (3) is rotatably engaged.

One end of the claw (5) is provided with a tooth (52) adapted to engage with the toothing of the tooth wheel (6) of the worm (V). The other end of the claw (5) is provided with an enlarged head (53) having a higher weight than the remaining part of the claw in such a way to act as inertial mass. To that end the head (53) is solid, whereas the remaining part of the body of the claw has lightening openings.

The head (53) has a cylindrical shape and is provided on the lateral wall with a concave bend (54) designed to match with a convex profile (55) provided at the other end of the body of the claw behind the tooth (52).

The tooth wheel (6) is provided with toothing composed of a plurality of teeth (60) that generate grooves (61) for engagement of the tooth (52) of each claw (5).

Figure 4:
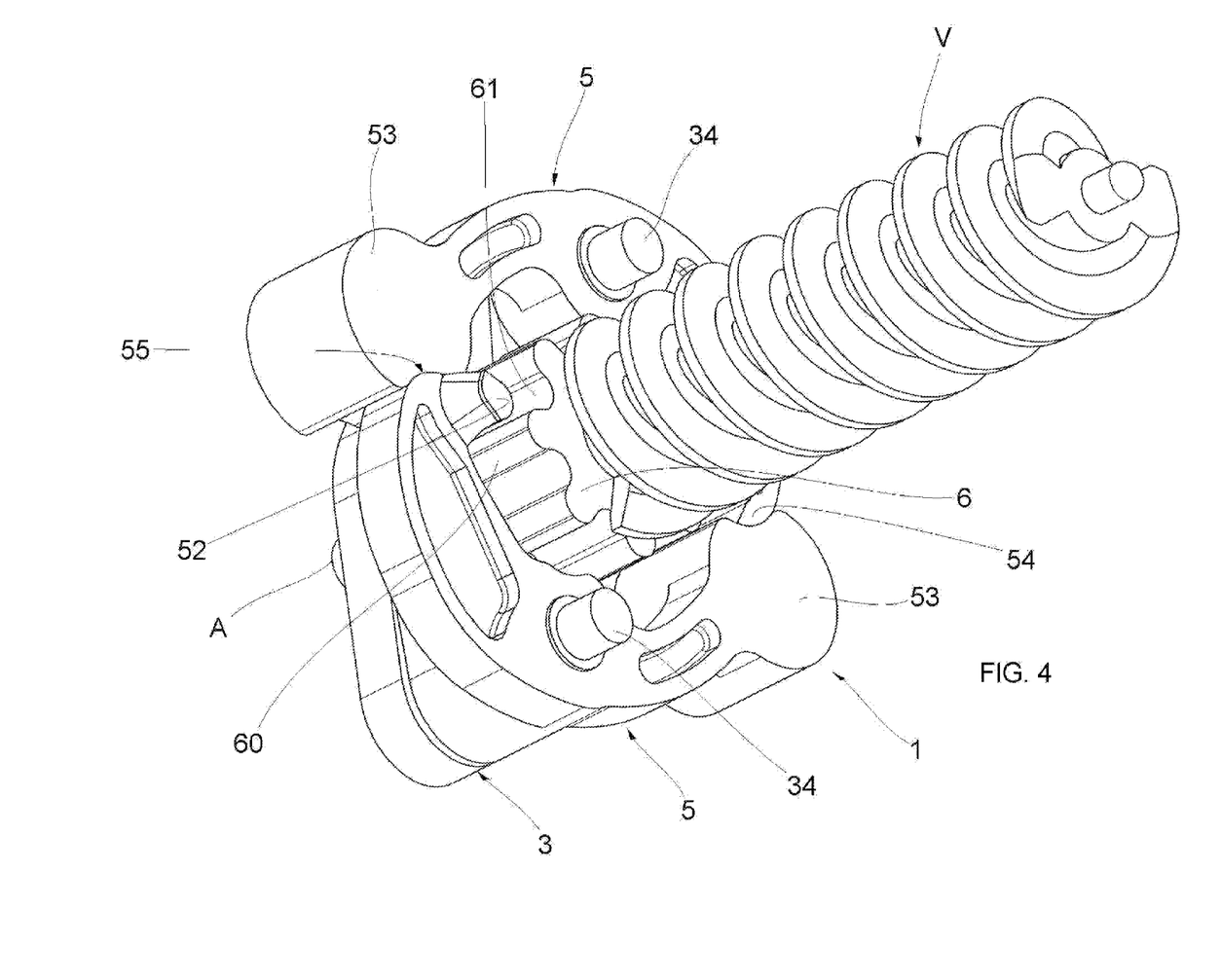
FIG. 4 is a perspective view of the uncoupling device of FIG. 3 assembled in uncoupled condition.
Figure 5:
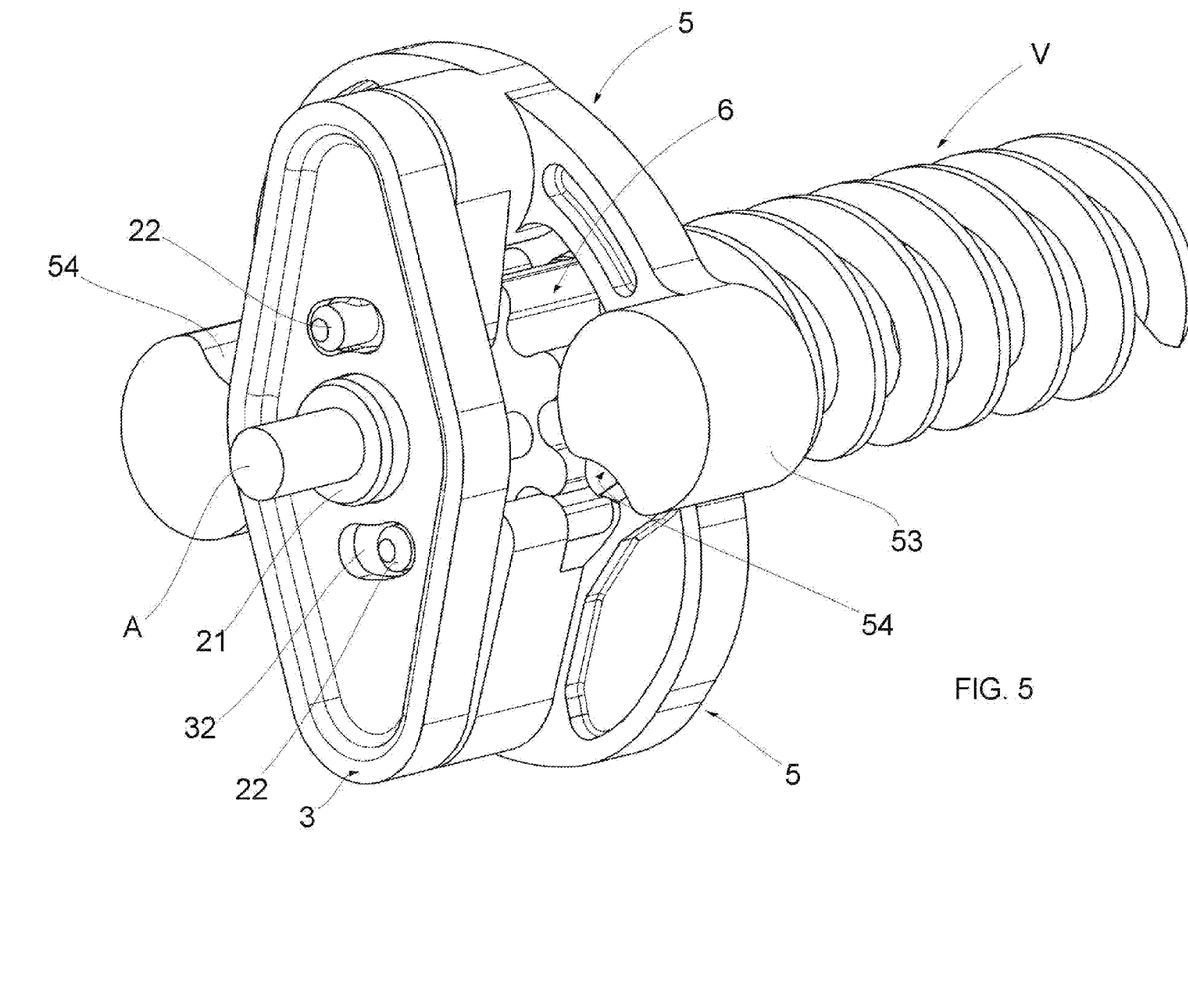
FIG. 5 is a perspective view of the uncoupling device rotated by 180° with respect to FIG. 4.
Figure 6:
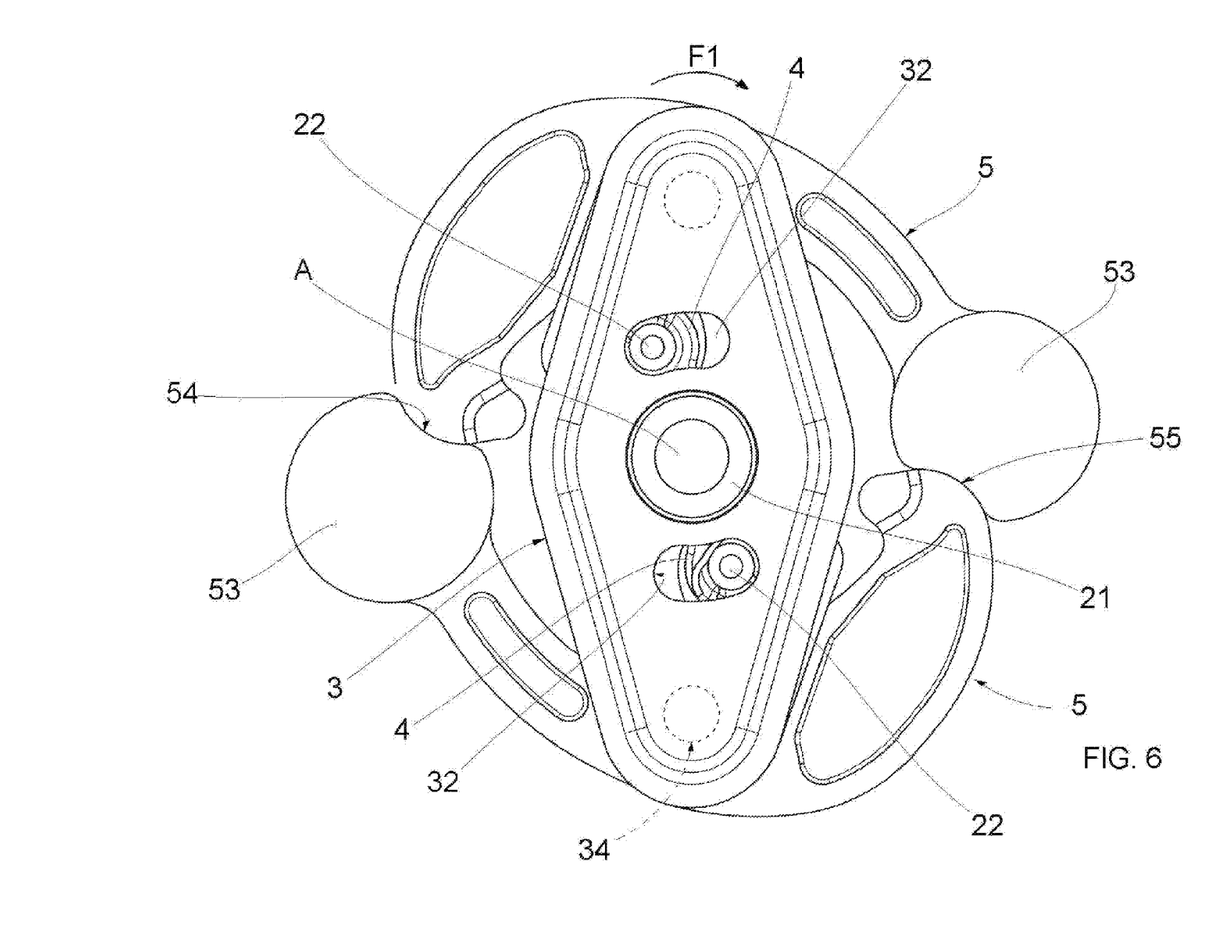
FIG. 6 is a front view of the uncoupling device of FIG. 5.

As shown in FIGS. 4, 5 and 6, when the elements of the uncoupling device (1) are assembled, the concave bend (54) of the inertial head (53) of a claw (5) rests against the convex profile (55) of the end of the other claw, thus maintaining the tooth (52) of each claw disengaged from the toothing of the tooth wheel (6).

Referring to FIG. 6, in such an uncoupling condition, the spring (4) causes the clockwise rotation of the flange (3) in the direction of the arrow (F1) with respect to the tang (21) of the support joined with the shaft (A). The rotation of the flange (3) is adjusted by the length of the slots (32) of the flange. In fact, said rotation is interrupted when the ends of the slots (32) of the flange touch the pins (22) of the support, as shown in FIG. 6. In such a situation the bends (55) of the inertial heads (53) push the convex profiles (54) of the claws, in such a way that the teeth (52) of the claws do not interfere with the toothing of the tooth wheel (6).

When the electrical motor drives the shaft (A) into rotation, for example in anticlockwise direction with reference to FIG. 6, the support (2) starts rotating together with the shaft (A) and drives the flange (3) into rotation because the pins (22) of the support (2) are engaged in the slots (32) of the flange (3). Accordingly, also the claws (5) rotate together with the flange (3).

Figure 7:
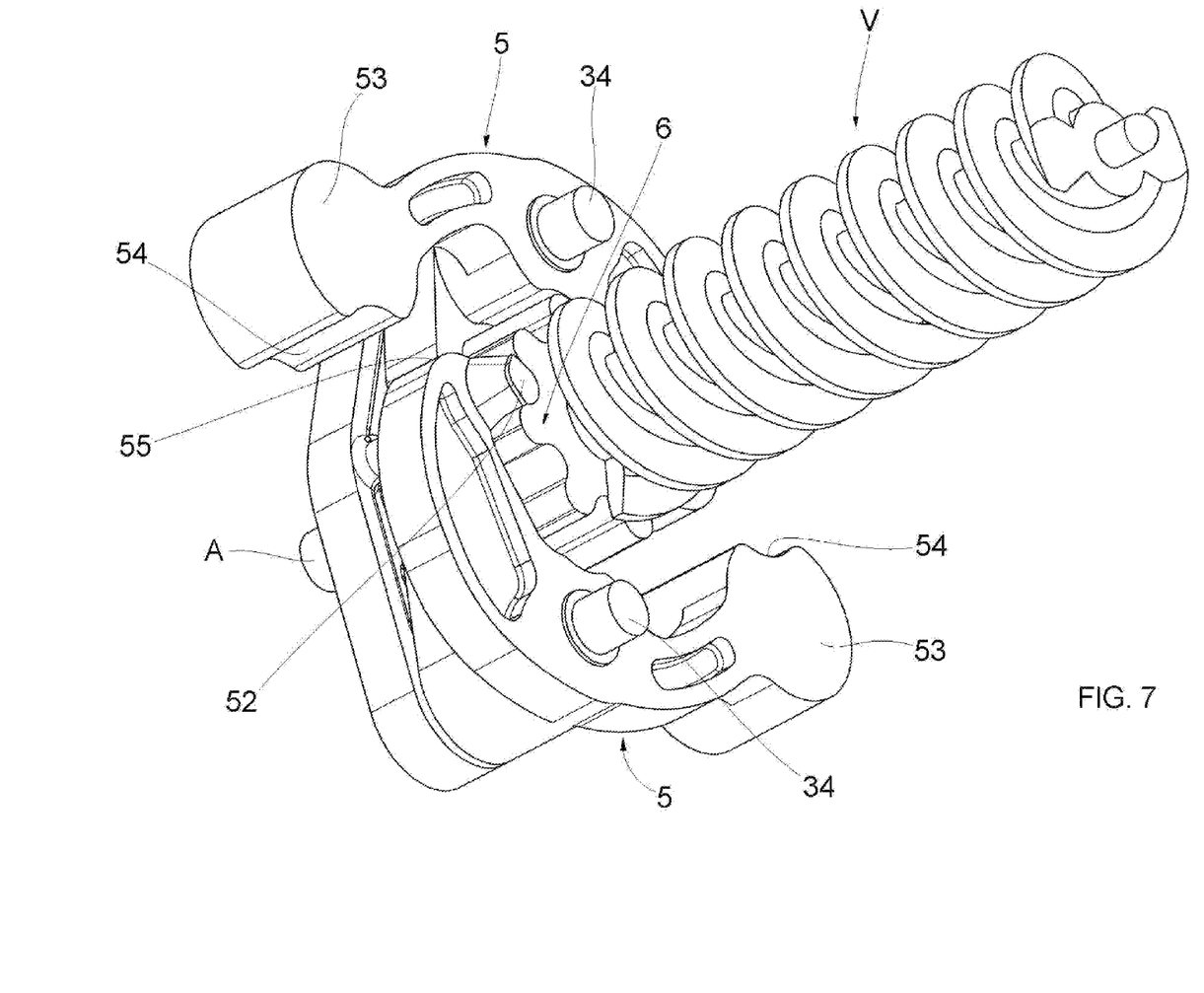
FIG. 7 is a perspective view of the uncoupling device of FIG. 3 assembled in coupled condition.
Figure 8:
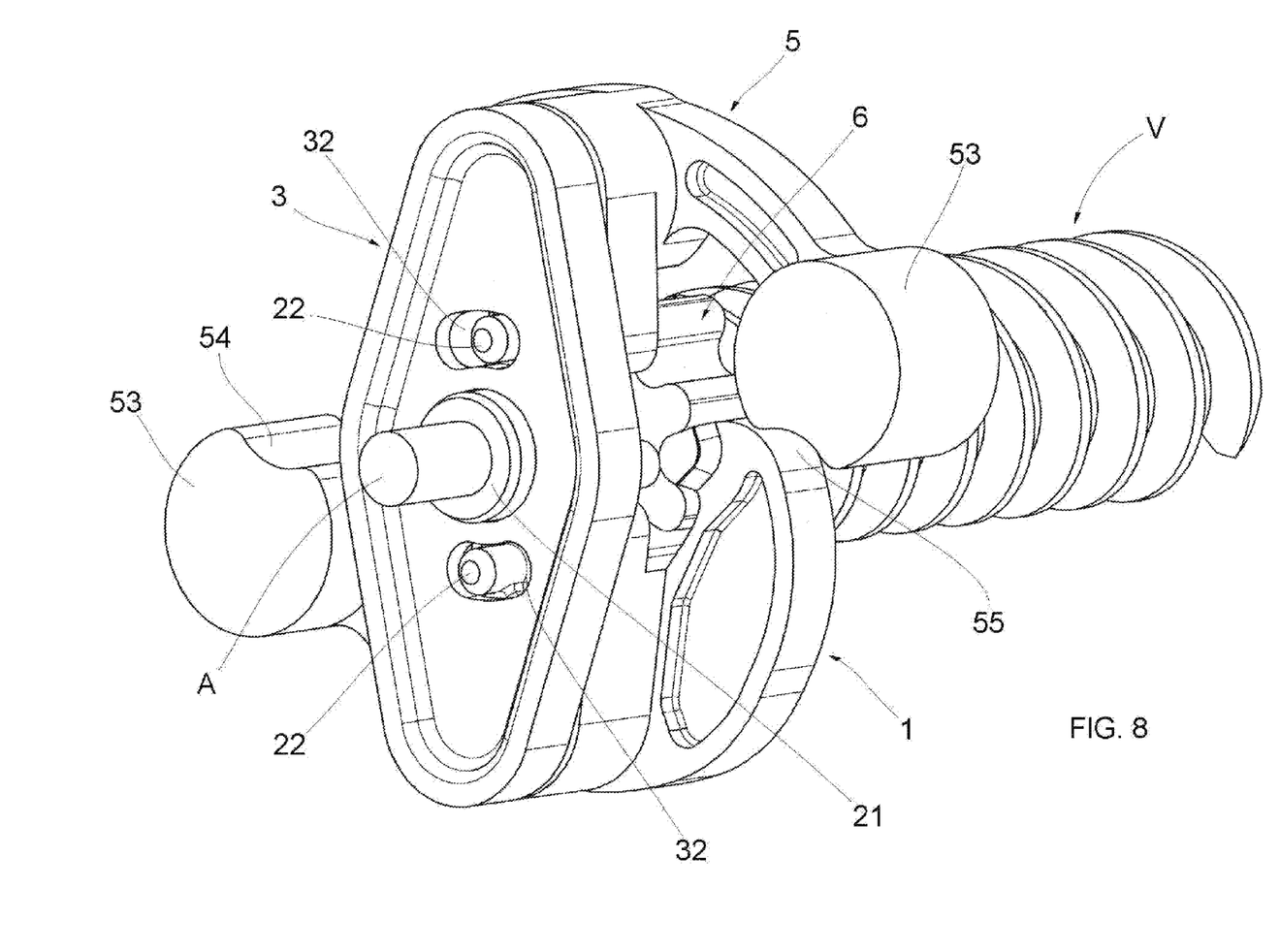
FIG. 8 is a perspective view of the uncoupling device rotated by 180° with respect to FIG. 7.
Figure 9:
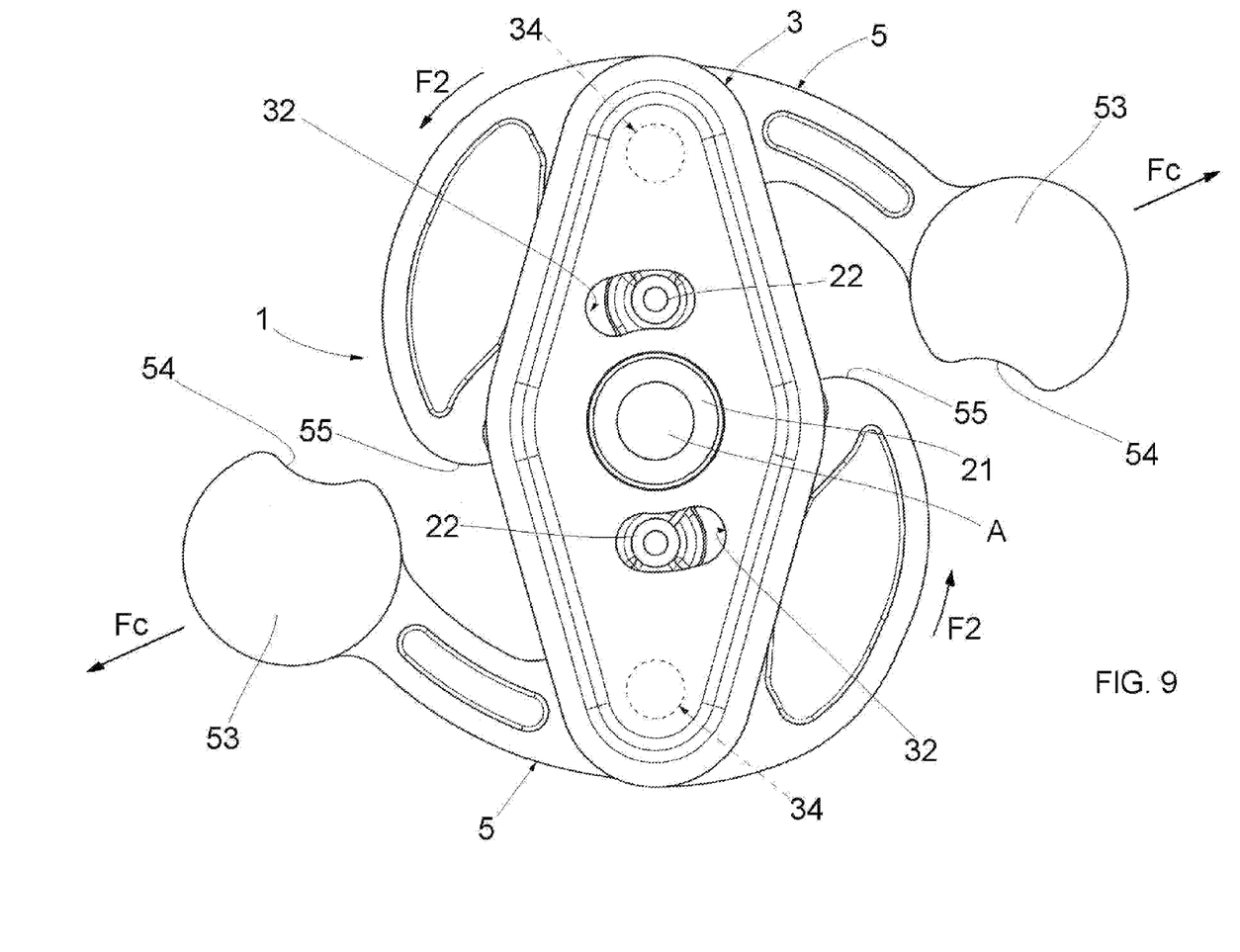
FIG. 9 is a front view of the uncoupling device of FIG. 8.

As shown in FIGS. 7, 8 and 9, the heads (53) of the claws act as inertial mass during rotation and are therefore subjected to a centrifugal force that tends to move them away from the axis of rotation that coincides with the axis of the shaft (A).

Referring to FIG. 9, the heads (53) of the claws are subjected to centrifugal force (Fc). Since the claws (5) are engaged in the pins (34) of the flange (3), the centrifugal force (Fc) applied on the heads (53) tends to make the claws (5) rotate around their pivoting axis (34) in the direction of the arrows (F2).

Consequently, as shown in FIG. 7, the teeth (52) of each claw (5) engage with the toothing of the tooth wheel (6), driving the worm (V) into rotation.

When the shaft (A) stops, the support (2) stops rotating the flange (3); therefore, the heads (53) of the claws are no longer subjected to centrifugal force. Accordingly, the spring (4) pushes the flange (3) to the end-of-travel position shown in FIG. 6) and the bends (54) of the heads of the claws push the convex profiles (55) of the claws, disengaging the teeth (52) of the claws from the toothing of the tooth wheel (6). So, the worm (V) is uncoupled from the shaft (A), allowing for maintenance operations in case of breakage or jamming of the door closing device.

Figure 10:
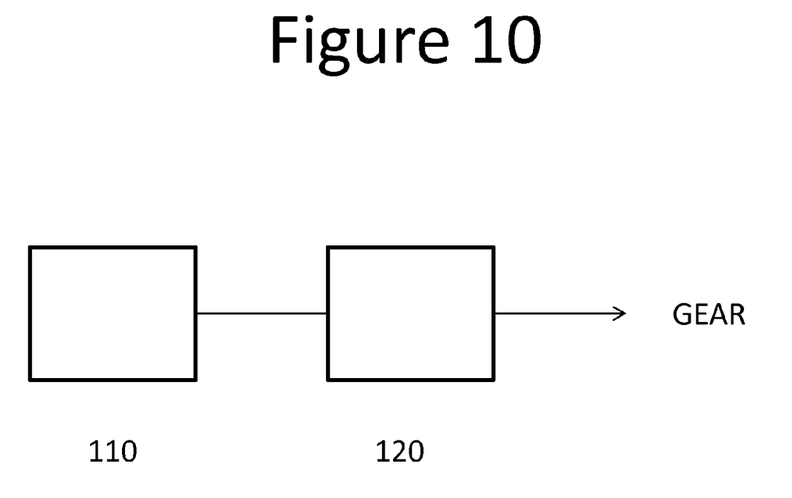
FIG. 10 is a schematic of the door lock striker 110, transmission 120 and gear.

FIG. 10 is a schematic of the door lock striker 110, transmission 120 and gear. As noted Above, the closing device for vehicle door comprises, among other things, a transmission 120 that connects said gear to the lock striker 110 of said closing device.

Numerous variations and modifications can be made to the present embodiment of the invention by an expert of the field, while still falling within the scope of the invention as claimed in the enclosed claims.

The invention claimed is:

1. A closing device for a vehicle door comprising:
   an electrical motor with a shaft (A),
   a worm (V) driven into rotation by said shaft (A),
   a gear in which said worm (V) is meshed,
   a transmission that connects said gear to a lock striker of said closing device,
   an uncoupling device (1) positioned between said shaft (A) and said worm (V) that couples the shaft (A) to the worm (V) when the shaft rotates and uncouples the shaft (A) from the worm (V) when the shaft is motionless;

said uncoupling device (1) comprising:

a support (2) directly joined to the shaft (A), a flange (3) connected to said support (2), a pair of claws (5) mounted on said flange (3) and provided with teeth (52) designed to engage with a toothing of a tooth wheel (6) joined to said worm (V), and a spring (4) positioned between said support (2) and said flange (3) in such a way to bring the flange (3) to a position in which the teeth (42) of said claws do not engage with the toothing of the tooth wheel (6) joined to the worm when the shaft is not rotating.

2. The closing device as claimed in claim 1, wherein each claw (5) comprises an enlarged head (53) that acts as an inertia mass subjected to a centrifugal force (CF) during the rotation of the uncoupling device, which meshes the teeth (52) of the claws into the toothing of the tooth wheel (6) joined to the worm.

3. The closing device as claimed in claim 2, wherein each claw (5) has a substantially C-shaped body (50) hinged in central position to a pin (34) of said flange, wherein said tooth (52) is situated at one end of said body (50) and said enlarged head (53) is situated at the other end of said body.

4. The closing device as claimed in claim 2, wherein said enlarged head (53) of each claw has a concave bend (54) designed to rest against a convex profile (55) provided at the end of the other claw behind the tooth (52) when the shaft is not rotating in such a way to release the tooth (52) from the toothing of the tooth wheel (6) joined to the worm.

5. The closing device as claimed in claim 1, wherein said support (2) comprises a central tang (21) in which the shaft (A) is fixed and first two pins (22) arranged in diametrically opposite positions to engage into corresponding slots (32) of the flange (3).

6. The closing device according to claim 5, wherein said flange (3) has a central hole (31) in which the tang (21) of the support is rotatably engaged and second two pins (34) arranged in diametrically opposite peripheral positions with respect to the central hole (31) on which said claws (5) are engaged.

* * * * *